Sept. 2, 1952    L. R. SPAULDING    2,608,923
PHOTOGRAPHIC DEVELOPING TANK
Filed Feb. 2, 1949
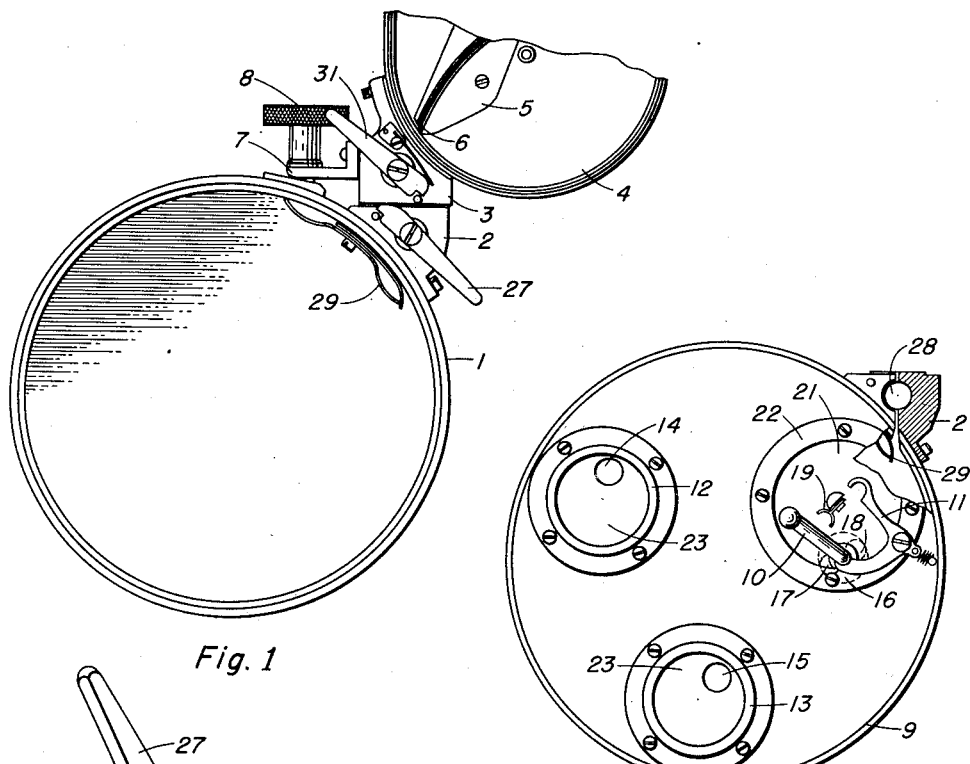
Fig. 1
Fig. 2
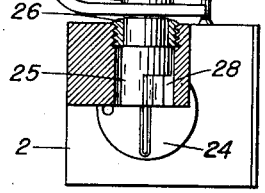
Fig. 4
Fig. 3
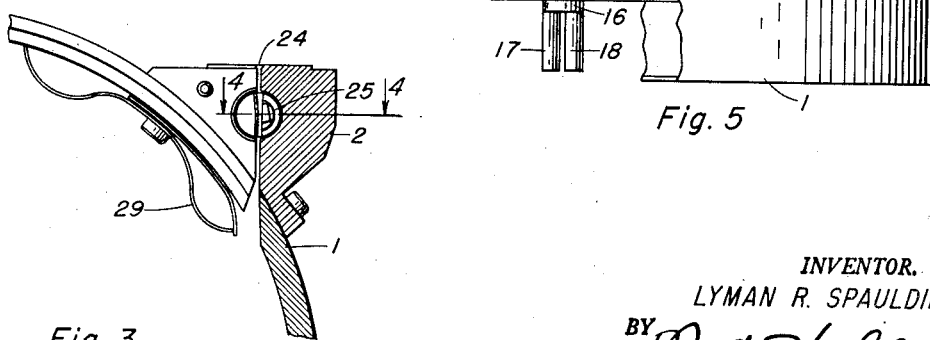
Fig. 5
INVENTOR.
LYMAN R. SPAULDING
BY Roy C. Hackley Jr.

UNITED STATES PATENT OFFICE 2,608,923

PHOTOGRAPHIC DEVELOPING TANK

Lyman R. Spaulding, Portland, Oreg.

Application February 2, 1949, Serial No. 74,165

6 Claims. (Cl. 95—90.5)

(Granted under the act of March 3, 1883, as amended April 30, 1928; 370 O. G. 757)

The invention described herein may be manufactured and used by or for the Government of the United States for governmental purposes without the payment to me of any royalty thereon in accordance with the provisions of the act of April 30, 1928 (ch. 460, 45 Stat. L. 467).

This invention is related to the processing of photographic film following exposure. In particular this invention is concerned with tank development of moving picture film.

There are many photographic film developing tanks known in the art of photography in general, and presumably also in that of moving picture photography in particular. This invention has in common with other development tanks some fundamental features but it is a novel tank intended particularly for use when short runs of moving picture film are required for examination immediately after exposure, or at any time without disturbing the camera or unexposed film.

A principal object of this invention is to provide a film developing tank that can serve first as a receiver for exposed film as it is fed from the camera, storing a considerable number of feet, and then serving as a developing tank when the contained film has been detached from the camera. Another object is to provide in a tank of this kind arrangements for detaching the film from the remainder of film in the camera without disturbing the camera and without risking exposure of any of the film to stray light. A third object is to provide arrangements for introducing developing chemicals into the tank without opening the tank and without accidental admission of light. Another object is to provide arrangements for attaching the tank to an associated camera and detaching it conveniently without danger of leakage of light either into the camera or into the tank. Still another object is to provide suitable processing of film including agitation thereof in the tank during the development.

What constitutes this invention is set forth in the following specification in reference to the attached drawing and is succinctly defined in the appended claims.

In the drawing, Figure 1 is a view in vertical side elevation showing the interior of the opened developing tank in a preferred form of embodiment as attached to a conventional moving picture camera. Figure 2 is a vertical side elevation of the tank of Figure 1 showing also in section part of the opening through which film enters the tank. Figure 3 is in more detail showing the film admission opening including means for cutting the film and closing the opening. Figure 4 is a rear elevational view, partly in section, of part of the the film cutting means shown in Figure 3, the sectional detail being taken along the line 4—4 shown in Figure 3. Figure 5 shows in elevation part of the means provided for admitting chemicals to the tank, and the means for agitating the film during development.

In Figure 1 a round shallow container or tank 1 is provided at the periphery with a film gate comprising in part a light valve and film cutter housing 2. A similar and mating housing 3 is provided and attached to a conventional camera. Inside camera 4, in lieu of the usual film take up reel, there is provided a special film chute 5 which guides the film 6 into housing 3. A bracket 7 and clamping nut 8 are provided for holding the tank 1 and the attachments in place on camera 4.

Tank 1 in Figure 1 is shown open without the cover in place. The tank cover 9 is shown in Figure 2. The partial section in Figure 2 is taken through the film cutter housing 2. Cover 9 is preferably fitted to tank 1 by threads at the edge. Cover 9 is equipped with manipulative means, including an operating crank 10 and a crank positioning lever 11. Also on cover 9 there are two light-tight vents 12 and 13 provided one for the admission of developing solutions, the other to permit the escape of air from within as it is replaced with solution and vice versa through their respective openings 14 and 15.

The elements shown in Figure 2 in plan are shown in elevation and partial section in Figure 5.

Crank 10 is connected through the cover 9 to a rotating piece 16 to which are attached two fingers 17 and 18. These two fingers 17 and 18 are spaced and positioned so that when crank 10 is held in place by a U-shaped hook 19 the space between fingers 17 and 18 is located in respect to the opening through cutter housing 2, the film will be readily directed into tank 1 and between fingers 17 and 18.

In addition to the rotation of crank 10, the bearing in which crank 10 rotates is carried in a disc 21, shown in plan in Figure 2, held in a circular channel formed under a retaining ring 22. Disc 21 and crank 10 together with fingers 17 and 18 are arranged to rotate under retaining ring 22 through an angle of the order of 90 degrees. This rotation is limited by lever 11 arranged to engage crank 10 in the two extreme positions. In one position fingers 17 and 18 are positioned under the opening in housing 2, and in the other position, fingers 17 and 18 are placed nearer the center of tank 1.

This is to provide for first receiving the film and afterward for moving the film as a whole toward the center of the tank and for rotating the film for agitation in the developing procedure.

Referring to Figure 2 and to Figure 5 light is prevented from entering tank 1 through openings 14 and 15 by providing inside vents 12 and 13 a plurality of baffles 23 each with a hole displaced as much as possible from the holes in the adjacent baffles. The baffles 23 are made of black plastic material so that reflection of light from one baffle to the next will be a minimum. This arrangement permits developing liquid to be poured into and out of tank 1 through vents 12 and 13 without exposing the film therein to unwanted light.

Mechanical details of film cutter housing 2 are shown in Figures 3 and 4. The housing has a thin slot 24 dimensioned to admit the film. In the housing a cylinder 25 is fitted similarly to the inside of a shut-off valve. Cylinder 25 is retained by a threaded bushing 26, and is provided with a handle 27. The edges of cylinder 25 and of the inside of the bore 28 in housing 2 are made sharp so that when cylinder 25 is rotated the film in the housing is cut while at the same time light is prevented from entering the tank.

The mating housing 3 attached to camera 4 is similar in principle to housing 2 and the parts therein. The functions and operation of housing 3 are the same as for housing 2, except that housing 3 is provided to protect the film in the camera 4 while housing 2 protects the film in the tank 1. The film is usually cut by cutter in housing 3 which also seals the camera from light. The film is then drawn into the tank by turning disk 21 and crank 10. The cutter arm 27 on the tank is closed to seal the tank. This prevents a short piece of film being left to clog the slot 24.

Inside tank 1 there is a film guide and deflector 29 provided to deflect the film after passing first between fingers 17 and 18 as described above. The shape of guide 29 is as shown. This shape deflects the end of the film downward to the bottom of tank 1 where the film coils into a roll as the camera 4 feeds the film into tank 1.

When the film is fed into tank 1 through housing 2, the film is guided toward fingers 17 and 18 by that portion of guide 29 nearest the film opening between housing 2 and tank 1. This guidance of the film assists in threading the film between the two fingers 17 and 18. As the film is fed farther into the tank 1, the leading end of the film follows around the inside wall of the tank. If guide 29 were not there, the leading end of the film would follow the inside wall of tank 1 around until the end of the film was in contact with that portion of the film between housing 2 and fingers 17 and 18. The leading end of the film would then follow the other portion of the film down between fingers 17 and 18. This is not desired because more than one thickness of film between fingers 17 and 18 can cause binding and interference with film movement. With guide 29 in place the leading end of the film follows the inside wall of the tank around until the left hand end of guide 29 as shown in Figure 1 is encountered. This deflects the leading end of the film downward, bending the film away from the upper wall of tank 1, and causing the film to pass between finger 17 and the center of the tank. With further feeding of film into the tank, the film is coiled in the region between finger 17 and the opposite side of tank 1.

In the operation of this invention, the top of the tank is screwed into the side of tank 1 thereby making a closed tank. The top comes to rest with the disk 21 and the fingers 17 and 18 properly positioned under the film slot 24. The housing 2 is placed in mating contact with housing 3 and the assemblage is secured in place by nut 8. When in place the light valves in housings 2 and 3 are opened by movement of lever 27 and a corresponding lever 31 on housing 3. The film 6 is directed through film chute 5 and through housings 3 and 2 into tank 1 where fingers 17 and 18 have been properly positioned by lever 11 and hook 19 to receive the film.

After exposure, lever 31 is shifted to cut the film and close the light valve. Disk 21 is turned about 90° and crank 10 is turned to draw film end into tank. The rotation of disc 21 moves the assemblage comprising crank 10, rotating piece 16, fingers 17 and 18, and hook 19 from the location near film guide 29 which is relatively close to the inside wall of the tank 1 to a location farther from the tank wall. The latter location is used to give the film held between fingers 17 and 18 room to follow around the fingers, when they are rotated, without crowding the film against the side of the tank. This is important to avoid too sharply bending and possibly scratching the film when handle 10 is reversed after having been rotated several revolutions in either direction. Then lever 27 is shifted to close the tank from light. The tank 1 is then released by nut 8 and removed. Crank 10 is then released from hook 19. Developing liquid is poured into tank 1 through vent 12 or 13. The film is then manipulated by rotating crank 10 first in one direction until the film is completely wound around the outside fingers 17 and 18. After a pause it is rotated in the opposite direction to expose the film fully and uniformly to the developing solution. After another pause the crank is reversed again, this operation being repeated several times depending on the developing time required by the solution. After developing, washing and fixing solutions are poured into the tank and the manipulation is continued as described.

I claim:

1. A film developing tank comprising a cylindrical container having means for admitting film, said means including an elongated narrow slot, film agitating means comprising a pair of spaced fingers mounted to be rotated around an axis between them, a crank extending outside said container and connected to said fingers to cause said rotation, said axis being parallel to said slot, said fingers and crank being supported on a rotating disc mounted in fixed relation to said container and arranged so the axis of said crank can be moved within a range of locations in said container, and positioning means mounted in fixed relation to said container and arranged to releasably engage said crank and establish the space between said fingers in line with said slot for admitting film to said container and between said fingers.

2. A film developing tank comprising a flat cylindrical container having a light-tight film gate including an elongated slot and means for cutting film entering said container, film agitating means extending within said container adjacent to said gate and including a pair of spaced fingers mounted to extend substantially parallel to said slot and also mounted to be rotated about a common axis substantially parallel to said slot, said fingers also being mounted in a movable section of said container to be displaced in a direction substantially at right angles to the axis of said cylindrical container within said container and having one position in which the space between said fingers is aligned with said slot, and a bent strip on the inner periphery of said container for deflecting and directing film away from said fingers.

3. In a film developing tank, the combination of a tank having a film entrance gate including an elongated slot, a pair of spaced spindles extending into said tank parallel with said slot and mutually rotatable about a common axis, said spindles being mounted in a rotatable section of the tank, crank means mounted externally of the tank and connected to at least one of said spindles to cause said mutual rotation, the arrangement being that said spindles are movable, by rotating said section of the tank, from a position near said gate and with the space between said spindles in alignment with said slot for receiving film, to a position nearer the center of said tank for film development, and means attached to the inside of said tank for deflecting the end of a film coiled in said tank, toward the center of said tank and away from said spindles.

4. A film developing tank comprising a flat cylindrical container having a light-tight film gate with an elongated slot arranged to direct film through said slot into said container along an initial path so that the film will coil within the tank, cutting means associated with said gate, film agitating means including a pair of closely spaced fingers extending into said container parallel with said slot and mounted for mutual rotation about an axis, crank means mounted externally of the container and connected to at least one of said spindles to cause said mutual rotation, rotatable means for mounting said agitating means within the container so that said agitating means has at least two alternate positions, said film agitating means in one position being adjacent said gate with the space between said fingers in line with said initial path to receive the film between the fingers as it enters said container, guide means fixed to the inside of said container for preventing film from again entering between said fingers as the film coils within the container, said film agitating means in another position being substantially removed from the wall of the container to allow ample room for agitation of the film.

5. In a film-developing tank the combination of a film gate in the side of said tank, said gate including an elongated slot, a pair of spaced finger-like, narrow, rounded projections in said tank and parallel to said slot arranged to be mutually rotated about an axis parallel and close to one of the projections, a shaft, a bearing, and a crank outside said tank for rotating said projections, a movable segment in the top of said tank supporting said bearing and arranged to be shifted between two prescribed positions so said projections occupy alternatively a position near said film gate and a position nearer the center of said tank, and means attached to said tank for setting the rotational position of said projections in said position near said gate so that the space between said projections is aligned with said slot and so that film entering said tank through said gate is directed between said projections.

6. In a film-developing tank as described in claim 5, the combination of elements thereof and a projection on the inside periphery of said tank and adjacent said film gate arranged to deflect the end of a film following the inside wall of said tank away from said wall to prevent said end of film from passing a second time between said projections.

LYMAN R. SPAULDING.

REFERENCES CITED

The following references are of record in the file of this patent:

UNITED STATES PATENTS

| Number | Name | Date |
| --- | --- | --- |
| 1,840,427 | Barnack | Jan. 12, 1932 |
| 1,889,818 | Beidler | Dec. 6, 1932 |
| 1,893,092 | Liberman | Jan. 3, 1933 |
| 1,921,012 | Stevens et al. | Aug. 8, 1933 |
| 2,203,963 | Lange | June 11, 1940 |
| 2,359,611 | Bolsey | Oct. 3, 1944 |
| 2,403,717 | Harvey | July 9, 1946 |